United States Patent [19]

Bickert et al.

[11] Patent Number: 4,828,895
[45] Date of Patent: May 9, 1989

[54] MAGNETIC RECORDING MEDIUM FOR TEST PURPOSES, IN PARTICULAR FOR CALIBRATING FLYING HEADS

[75] Inventors: Waltraud Bickert, Ludwigshafen; Heide Brunkhorst, Frankenthal; Istvan Gergely, Edingen-Neckarhausen; Wolfgang Oetzel, Speyer, all of Fed. Rep. of Germany

[73] Assignee: BASF Aktiengesellschaft, Ludwigshafen, Fed. Rep. of Germany

[21] Appl. No.: 170,322

[22] Filed: Mar. 18, 1988

[30] Foreign Application Priority Data

Mar. 28, 1987 [DE] Fed. Rep. of Germany ... 8704667[U]

[51] Int. Cl.$^4$ .............................................. G11B 5/64
[52] U.S. Cl. ...................................... 428/65; 427/128; 428/141; 428/694; 428/900
[58] Field of Search ................... 428/141, 65, 66, 694, 428/900; 427/128, 131

[56] References Cited

U.S. PATENT DOCUMENTS

| 4,326,229 | 4/1982 | Yanagisawa | 427/131 |
| 4,673,617 | 6/1987 | Yoshida et al. | 428/694 |
| 4,689,260 | 8/1987 | Briska et al. | 427/131 |

Primary Examiner—Paul J. Thibodeau
Attorney, Agent, or Firm—Keil & Weinkauf

[57] ABSTRACT

A magnetic recording medium for test purposes, in particular for calibrating flying heads, consists of a firm substrate which has a raised calibration area in the form of an arc-shaped step of defined length, width, height and hardness. Sharp initial and end edges in conjunction with a defined minimum arc length give easily evaluated measured signals in the low frequency range. The test recording medium can be used for any type of magnetic layer on recording media and/or for heads associated with these.

14 Claims, 2 Drawing Sheets

MAGNETIC RECORDING MEDIUM FOR TEST PURPOSES, IN PARTICULAR FOR CALIBRATING FLYING HEADS

BACKGROUND OF THE INVENTION AND PRIOR ART

The present invention relates to a magnetic recording medium for test purposes, in particular for calibrating flying heads, comprising an inflexible substrate and at least one magnetic layer applied thereon, at least one step-shaped protrusion being provided on the surface of the magnetic layer and arranged at least partly in the recording area of the recording medium, and the protrusion consisting of hard material.

In a known method for tedting hard magnetic disks in respect to their suitability for use with flying heads, a head which is as true as possible to the service head and provided with a piezo element is allowed to fly over the entire recording area of the disk and the resulting accelerations/decelerations are measured and recorded. Because of the variability of the magnetic signals and piezo signals due to climatic conditions, dust or the test method itself, the use of original disks is not advisable. Classification of disks according to different signal amplitudes is impossible primarily because of the very different sensitivities of the flying test heads mentioned. In order to measure and electronically compensate these differences, reference disks having constant acceleration/deceleration signal values are required.

The possibility of exciting flying test heads on a simulation test stand (ie. a shaker) and measuring the system response up to about 15 kHz in comparison with sinusoidal or impulse excitation is disadvantageous since the head flight characteristics, some of which differ greatly, are not taken into account.

A magnetic recording medium of this type for testing disks or heads is already known, the magnetic layer being a phosphorus/nickel layer and a narrow step-like raised area being arranged along a radius over the recording area of the disk. The step-like raised area consists of titanium and has rounded end edges. In practical use, this disk is disadvantageous and gives in particular signals which lie in the HF (high frequency) analysis range and whose signal amplitude can be evaluated.

OBJECT AND SUMMARY OF THE INVENTION

It is an object of the present invention to improve a recording medium for test purposes for the above-mentioned applications.

We have found that this object is achieved by a magnetic recording medium for test purposes, in particular for calibrating flying heads, comprising an inflexible substrate and at least one magnetic layer applied thereon, at least one step-shaped protrusion being provided on the magnetic layer surface and arranged at least partly in the recording area of the recording medium and the protrusion consisting of hard material, if
the step-shaped protrusion is arc-shaped,
the ends of the step-shaped protrusion are arranged radially and have sharp edges at right angles to the direction of rotation of the recording medium, and
the step-shaped protrusion has a height of 0.30–0.70 μm.

This gave good signal resolution together with soft and substantially inaudible head/step contact.

The arc shape of the step-shaped protrusion has the particular advantage that analog signals are obtained which are reproducible in the LF (low frequency) analysis range, both step edges generating similar signals having a predetermined, defined shape.

The novel magnetic recording medium is particularly advantageous if it is in the form of a hard magnetic disk, for example a Winchester disk.

In principle, however, the recording medium can have any shape since it can in any case be fixed centrally for rotation and can be used with a suitable calibration head. Advantageously, the step-shaped protrusion (referred to below as the arc-shaped step) is arranged roughly in the center of the recording area of the recording medium, preferably closer to the center, in particular the central hole of the recording medium, since the head flies over the disk at the lowest level in the inner third and the measured signal is therefore highest. Thus, at least rough mean values can be obtained over the disk radius, and the adjacent, undisturbed flight areas can also be measured for comparison.

In a further embodiment, the arc-shaped step consists of chromium or an alloy or ceramic predominantly containing chromium or chromium oxide. Chromium, the chromium oxide ceramic or the chromium alloy may be applied by vapor deposition or another suitable method. For example, a lower layer or the magnetic layer itself may be produced from chromium or chromium oxide.

The mechanical abrasion resistance, for example of a chromium step applied by vapor deposition, is sufficiently high if 3,200 starts are achieved without signs of wear.

For other methods of use, it is also possible to employ the following arrangements:

(a) A plurality of arc-shaped steps on different circular tracks.

(b) As for (a) but on different radii mutually offset by an angle.

(c) A plurality of arc-shaped steps on different circular tracks and the same radius.

In a practical embodiment, the arc length should correspond at least to the arc formed by the angle $a_{min}$ by the relationship $\Delta_{min} = t_{min}el \cdot 2\pi f$, where $t_{min}el$ is the settling time of the measuring arrangement and $2\pi f$ is the angular frequency of the disk rotation, and as a result of which clearly distinguishable analog signals are obtained.

In another embodiment, the length of the arc-shaped step should be chosen to be greater than the arc of the angle $a_{min} = 18°$ and preferably greater than the arc of the angle $\alpha = 40°$, in particular about 60°.

Examples of the invention are shown in the drawings and described below.

DETAILED DESCRIPTION OF THE PREFERRED EMBODIMENTS

Figure 1A:
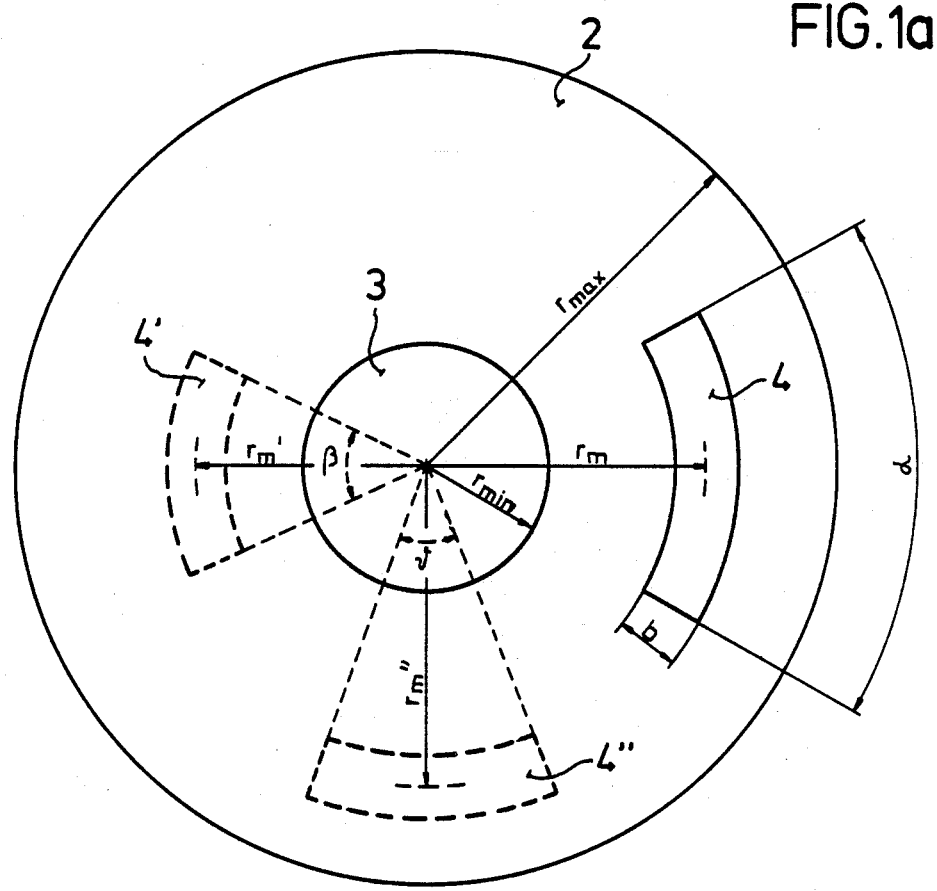
FIGS. 1a and 1b, respectively, show a plan view and side view of a disk having arc-shaped steps.
Figure 1B:
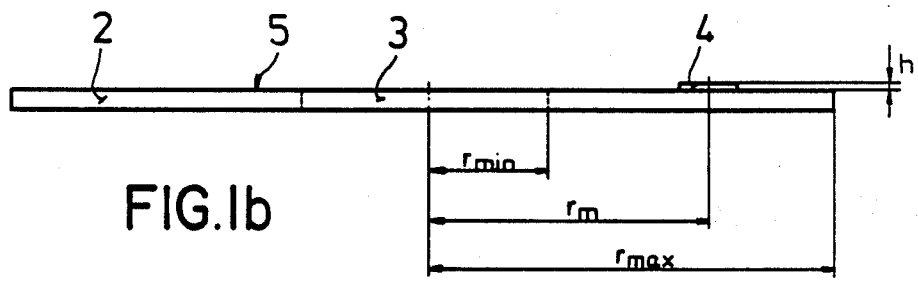

FIG. 1 shows a disk 2 which has a circular shape and a central hole 3, the recording area being determined by the difference between the radii, $r_{max}$-$r_{min}$. An arc-shaped step 4 is provided roughly in the center of this area, on the radius $r_m$. Preferably, the arc-shaped step 4 should be arranged closer to the central hole 3, so that $r_m$ need not be the mean radius (corresponding to the arithmetic mean of $r_{max}$ and $r_{min}$ or half the difference $r_{max}$-$r_{min}$) but can be the said radius.

The length L of the arc-shaped step is restricted by the measuring electronics, the minimum length being determined by the minimum angle $\alpha_{min} = t_{min}el \cdot \omega(omega) = t_{min}el \cdot 2\pi f$, regardless of the particular disk diameter. In this expression, $2\pi f$ is the angular frequency, which is also obtained directly as an angle from the speed in revolutions/sec $\times 360°$. In the case of a 5¼ inch disk (130 mm diameter) and at a speed of 60 revolutions/sec, the length of the step according to FIG. 3, with $t_L = 2.8$ ms, corresponds to the arc length of an angle of about 60°, while the minimum arc length is given by the arc angle $\alpha_{min}$ of about 17.2° (at $t_{min}el = 0.8$ ms).

Figure 2:
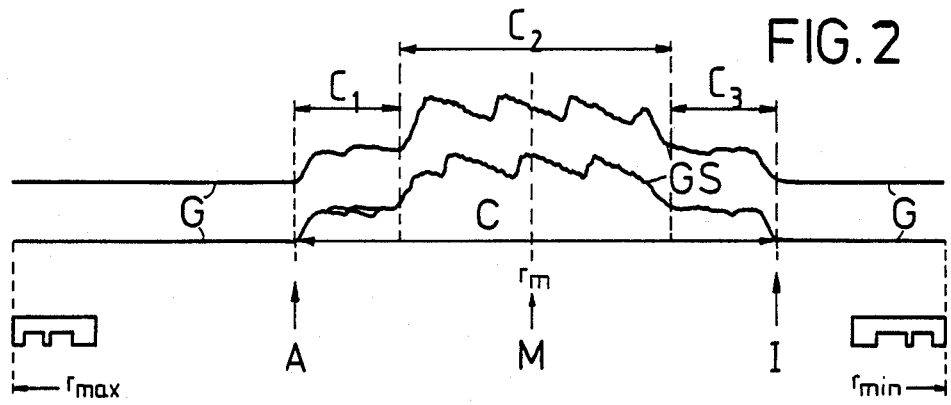
FIG. 2 shows the geometric curve of the acceleration movement of the head over the arc-shaped step according to the invention.
Figure 3:
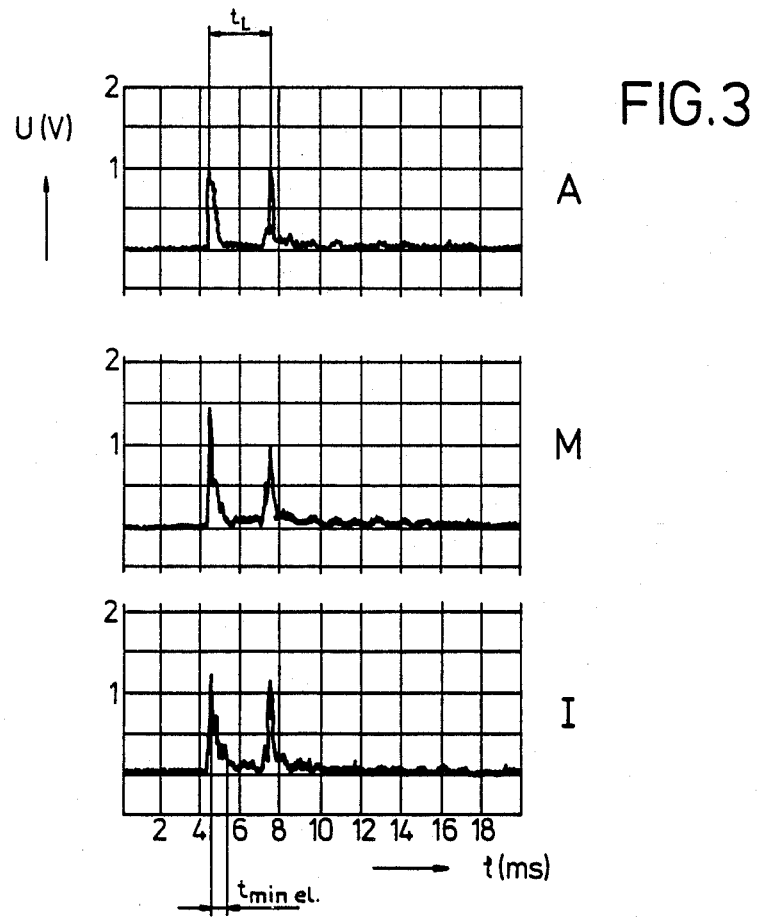
FIG. 3 shows the variation in the measured signals with time when the head is loaded in each case on a constant test radius of the disk, over the arc-shaped step.

$t_{min}el$ is the settling time of the measuring electronics, and this time expires after the steep flank of one of the sharp-edged step ends of arc-shaped step 4 has generated a strong signal (cf. FIG. 3). The two voltage peaks generated during one revolution of the disk are integrated by means of a conventional integrating circuit over a period of the order of seconds, for example over 10 disk revolutions, in order to compensate for ambient effects, so that a d.c. voltage signal according to FIG. 2 is obtained.

Regardless of other disk dimensions, the height h of the arc-shaped step should be about 0.3–0.7 μm, preferably about 0.35–0.65 μm, with a nominal flight height of the head of 0.4 μm. The lower limit (0.3 or 0.35 μm) is determined by poor resolution of the measured signal generated by the step 4, and the background noise of the recording layer. The upper limit (0.65 or 0.7 μm) is determined by the audibility limit of the test head/step contact, ie. the contact should not be audible, resulting in a very long head life and disk life.

The radial dimension (width) of the arc-shaped step should be chosen to be greater than the radial width of the flying head, which is shown schematically in FIG. 2. The head is provided with a piezo element in a conventional manner. When step width and flying head width approach one another, the head performs more rocking movements instead of the desired clear ascending and descending movement. The width c of the arc-shaped step was chosen as 10 mm for the 5¼ inch disk (130 mm diameter) and a head width b of about 4 mm.

The arc-shaped step 4 should in general consist of a harder material than the magnetic layer, for example of chromium or a chromium or chromium oxide alloy or ceramic. It is therefore generally advantageous to use a material containing chromium or chromium dioxide. In a practical example, the arc-shaped step was produced by vapor deposition of metallic chromium, giving step ends which had very sharp edges. However, it is also possible to use other suitable and similar hard materials without sacrificing the advantages of the invention. For an optimum signal/noise ratio, as far as possible vertical and linear edges are desirable in the transverse direction of step 4 (radial direction of the disk), such edges being advantageously obtainable by the said vapor deposition method in conjunction with a suitable contact mask. For clean separation of the measured signals which have been generated by the sharp-edged step ends, without the necessity of excessively expensive electronics for signal separation, a sufficient distance between the front end and rear end of the step, ie. a sufficient step length, is required.

The arc-shaped step 4 described was optimized for maximum acceleration values at the step edges and for optimum adhesion of the step 4 to the disk.

In the test procedure, the test head starts and lands outside the arc-shaped step 4 in order to protect the latter, and is positioned over the arc-shaped step in flight. On passing the front and rear ends of the arc-shaped step, the flying test head experiences vertical acceleration impulses, which is shown above the geometry of the disk and of the arc-shaped step 4 in FIG. 2.

FIG. 2 shows a double curve for the rectified measured signal, which is based on two successive measurements using the same head/disk arrangement in order to be able to check the repeatability of the measurement.

To the right and left of the hill-like acceleration signal are undisturbed background noise signals G, which are generated by the magnetic oxide layer of the disk and are measured as reference values and used for adjusting the sensitivity of the measuring apparatus. An evaluated acceleration signal GS, which increases stepwise, has a few sawtooth-like peaks in the central part and then decreases again stepwise (similarly to the beginning), is obtained over the step width c from the outer edge A through the center M to the inner edge I. Specifically, therefore, this acceleration signal comprises the ranges $C_1$ and $C_3$, in which the head is not yet, or not yet completely, over the step, and the range $C_2$, in which the head flies completely above the step.

The flying head F is shown in the extreme outer and inner positions on the disk.

The individual signals of the head accelerations, which are generated in the geometrical outer (A), central (M) and inner areas (I) of the arc-like step, are converted to measured signals via a measuring arrangement and are shown in FIGS. 3A, 3M and 3I.

The signal shown in each case is the output signal of the measuring arrangement, which essentially consists of a charge-sensitive amplifier, in this case an oscillograph, and a filter for selecting the LF signal in the range of about 1–20 kHz. The measured signals in FIGS. 3A, 3M and 3I are therefore oscillograph patterns. In each case, there is a voltage peak at the front end, a voltage drop up to the time $t_{min}el$ of about 0.8 ms in this case, a further voltage peak at the rear end with roughly the same voltage drop in the time $t_{min}el$, and a time interval $t_L$ of about 2.8 ms between the voltage peaks, corresponding to an arc length formed by an angle of about 60°.

FIG. 1 shows a plan view of further arc-shaped steps 4' and 4", which here lie on different angular radii of the disk and are located at different radial distances $r_m'$ and $r_m''$ from the center of the disk 2. The arc lengths correspond to different angles $\beta = 40°$ and $\theta = 50°$, corresponding to times $t_L$ of 1.85 and 2.3 ms, respectively. Both combinations of different arc-shaped steps 4, 4', 4" having different positions, arc lengths, widths and heights, as defined above, and combinations of the same radius or diameter with the same arc lengths, widths and heights are possible, depending on the aim of the test or measurement.

The invention permits the generation of roughly vertical sharp and relatively linear acceleration signals which can be generated by an economically obtainable calibration disk and can be evaluated as LF signals by an economical measuring method. The calibration disks have proven outstanding in practice for testing heads and for testing disk drives and disks in the event of head changes.

We claim:

1. A magnetic recording medium for test purposes, in particular for calibrating flying heads, comprising an inflexible substrate and at least one magnetic layer applied thereon, at least one step-shaped protrusion being provided on the magnetic layer surface and arranged at least partly in the recording area of the recording medium and the step-shaped protrusion consisting of material harder than the magnetic layer material, wherein the step-shaped protrusion is arc-shaped, the ends of the step-shaped protrusion are arranged radially and have sharp edges at right angles to the direction of rotation of the recording medium, and the step-shaped protrusion has a height of 0.30–0.70 $\mu$m.

2. A recording medium as claimed in claim 1, which is a hard magnetic disk.

3. A recording medium as claimed in claim 1, wherein the step-shaped protrusion is arranged approximately in the center of the recording area.

4. A recording medium as claimed in claim 1, wherein the step-shaped protrusion is arranged inside the recording area and substantially closer to the center of the recording medium than the center of the recording area.

5. A recording medium as claimed in claim 1, in the form of a hard magnetic disk, wherein a plurality of step-shaped protrusions are provided on different angular radii of the disk.

6. A recording medium as claimed in claim 1, in the form of a hard magnetic disk, wherein a plurality of step-shaped protrusions are provided on different circular disk tracks and on different angular radii of the disk.

7. A recording medium as claimed in claim 1, in the form of a hard magnetic disk, wherein a plurality of step-shaped protrusions are provided on different circular disk tracks and on the same angular radius of the disk.

8. A recording medium as claimed in claim 1, wherein the step-shaped protrusion consists of a material containing chromium or chromium dioxide.

9. A recording medium as claimed in claim 1, wherein having sharp-edged ends the at least one step-shaped protrusion has produced by vapor deposition of a material containing chromium or chromium dioxide.

10. A magnetic disk for test purposes, comprising an inflexible substrate and at least one magnetic layer applied thereon, at least one step-shaped protrusion being provided on the magnetic layer surface and arranged at least partly in the recording area of the disk and the step-shaped protrusion consisting of material harder than the magnetic layer material, wherein the step-shaped protrusion is in the form of an arc-shaped step, the ends of the arc-shaped step are arranged radially and have sharp edges at right angles to the direction of rotation of the recording medium, the arc-shaped step has a height of 0.30–0.70 $\mu$m and the length of the arc-shaped step is greater than the arc formed by an angle of 18°.

11. A magnetic disk as claimed in claim 10, wherein the length of the arc-shaped step is greater than the arc formed by an angle of 40°.

12. A magnetic disk as claimed in claim 11, wherein the length of the arc-shaped step corresponds to the arc formed by an angle of 60°.

13. A recording medium as claimed in claim 10, wherein the step-shaped protrusion consists of a material containing chromium or chromium dioxide.

14. A recording medium as claimed in claim 10, wherein having sharp-edged ends the at least one step-shaped protrusion has are produced by vapor deposition of a material containing chromium or chromium dioxide.

* * * * *

UNITED STATES PATENT AND TRADEMARK OFFICE
CERTIFICATE OF CORRECTION

PATENT NO. : 4,828,895

DATED : May 9, 1989

INVENTOR(S) : Bickert et al.

It is certified that error appears in the above-identified patent and that said Letters Patent is hereby corrected as shown below:

| | | |
|---|---|---|
| Claim 9, Col. 6, line 10 | delete "having sharp-edged ends" | |
| Claim 9, Col. 6, line 11 | after "protrusion" insert -- having sharp-edged ends -- ; also delete "has" and substitute -- are -- | |
| Claim 14, Col. 6, line 38 | delete "having sharp-edged ends" | |
| Claim 14, Col. 6, line 39 | after "protrusion" insert -- having sharp-edged ends -- ; also delete "has" | |

Signed and Sealed this

Sixth Day of February, 1990

*Attest:*

JEFFREY M. SAMUELS

*Attesting Officer*  *Acting Commissioner of Patents and Trademarks*